United States Patent [19]

Jandrell

[11] Patent Number: 4,468,702

[45] Date of Patent: Aug. 28, 1984

[54] RADIATION AND STATIC ELECTRICITY SUPPRESSION DEVICE

[75] Inventor: Louis H. M. Jandrell, Ashley Gardens, South Africa

[73] Assignee: Daca International B.V., Sligo, Ireland

[21] Appl. No.: 369,127

[22] Filed: Apr. 16, 1982

[51] Int. Cl.$^3$ .............................................. H04N 5/65
[52] U.S. Cl. .................................. 358/245; 174/35 R
[58] Field of Search ........................ 358/245; 174/35.4

[56] References Cited

U.S. PATENT DOCUMENTS

| | | |
|---|---|---|
| 3,952,152 | 4/1976 | Lill et al. . |
| 4,246,613 | 1/1981 | Choder et al. . |
| 4,247,737 | 1/1981 | Johnson et al. . |
| 4,253,737 | 3/1981 | Thomsen et al. . |

FOREIGN PATENT DOCUMENTS

| | | | |
|---|---|---|---|
| 810814 | 3/1959 | United Kingdom | 174/35.4 |

*Primary Examiner*—Howard W. Britton
*Assistant Examiner*—Edward L. Coles
*Attorney, Agent, or Firm*—Phillips, Moore, Lempio & Finley

[57] ABSTRACT

A radiation and static electricity suppression device is disclosed that is formed of a mesh fabric having at least some of the yarns capable of conducting electricity. The mesh is affixed to a frame that serves to conform the mesh to the surface of a cathode ray tube. A grounding connection is included to ground the mesh to the chassis of the cathode ray tube. The mesh when grounded supresses the static field and significantly reduces electro-magnetic radiation emanating from the CRT circuitry and passing through the opening in the CRT housing.

9 Claims, 7 Drawing Figures

RADIATION AND STATIC ELECTRICITY SUPPRESSION DEVICE

TECHNICAL FIELD

This invention relates to the suppression of radiation and static electricity. In particular, it relates to suppression of static electricity and radiation emanating from cathode ray tubes.

BACKGROUND OF THE INVENTION

Cathode ray tubes are now commonplace as a result of the rapid increase in the use of computers and the like. Since the surface of a cathode ray tube is relatively dark, it serves to reflect glare from the surrounding environment, hence reading of the information on the cathode ray tube can become difficult. This glare problem was to a large extent overcome by the addition of a glare filter as described in U.S. Pat. No. 4,253,737 issued to Patrick Brennan and Eric Thomson.

An equally and possibly more serious problem is the radiation of electro-magnetic energy from the area of the display tube and the generation of a static electrical field adjacent to the cathode ray tube. While a good deal of attention has been directed toward the suppression of electro-magnetic radiation, it has not been completely eliminated. The current levels of radiation eminating from cathode ray tubes are generally well below the threshold of injury to operators. However, emitted radiation still exists and can cause a security problem by permitting the clandestine interception of and the interpretation of the intercepted information.

Currently electro-magnetic radiation is reduced by a metal, for example stainless steel, screen embedded or sandwiched between conformed glass plates positioned in front of the display tube. While these systems perform the desired function, they do not necessarily reduce glare. Further the inherent structure of the screen being displaced from the display tube can result in shadows, Newton's rings or Moire patterns.

Static electricity has, in recent months, received a good deal of attention as a potential health hazard. In one instance, a study was conducted in Norway wherein there was an increased incidence of face rash among operators of video display terminals, including cathode ray tubes. This is attributed to the fact that the operator is positioned in the static field created by this cathode ray tube so that the operator becomes charged. With a charge on the operator, oppositely charged dust and other airborne pollutants are attracted to the operator so that any irritants, bacteria, or virus are "delivered" to the operator as a result of the induced static charge.

Similarly, the face of the cathode ray tube carries a static charge thus a particulate matter such as dust, smoke particles or the like having an opposite electric charge are attracted to the surface of the tube. When the mesh antiglare filter such as described in U.S. Pat. No. 4,253,737 is utilized, it is necessary to remove the filter from the cathode ray tube in order to clean the face.

DISCLOSURE OF THE INVENTION

The present invention is directed to overcoming one or more of the problems as set forth above.

In one aspect of this invention, a radiation and static electricity device for a cathode ray tube includes a fine mesh fabric consisting of warp and weft yarns in which some of either the warp or the weft yarns are electrically conductive and further the electrically conductive yarns are generally evenly distributed across the mesh. The fine mesh fabric is conformable to the viewing surface of the cathode ray tube and provision is included to electrically ground the electrically conductive yarns to the ground associated with the cathode ray tube.

The radiation and static electricity suppression device disclosed herein solves a major problem of the accumulation of dust and dirt on the cathode ray tube due to static electricity by completely suppressing the static field surrounding the face of the cathode ray tube. Furthermore, the supression device markedly reduces electro-magnetic radiation emminating from the face plate opening of the housing for the cathode ray tube.

BEST MODE OF CARRYING OUT THE INVENTION

Figure 1:
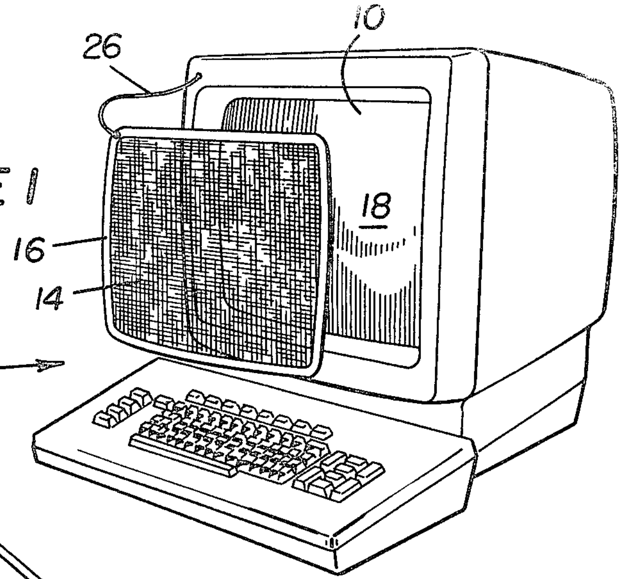
FIG. 1 is a perspective view of a cathode ray tube and the associated structure along with an embodiment of the radiation and static electricity suppression device disclosed herein.

Referring now to FIG. 1, a cathode ray tube incorporated in a computer terminal type device 12 is illustrated.

For purposes of this specification and appended claims, the term "cathode ray tube" will be used to encompass the cathode ray tube itself, the associated circuitry necessary to drive the electron beam or beams utilized in the cathode ray tube for display of intellegence on the screen surface, and further will include the grounding chassis which may or may not include the housing of the terminal or a like device. In summary, the term cathode ray tube would encompass what is currently sold in the marketplace as a television set, a remote display device, a video display tube and associated circuitry used in a word processor, or any other installation where a cathode ray tube is utilized for electronic display of information on the surface of the tube itself.

Figure 2:
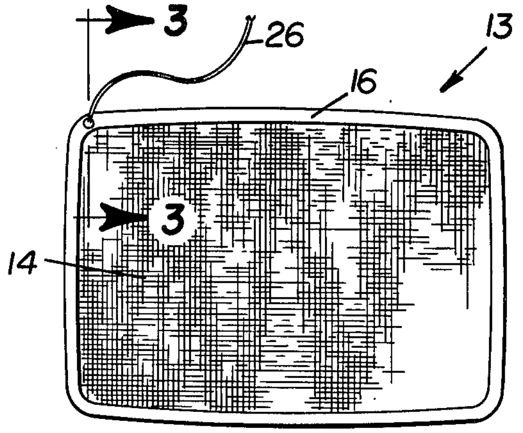
FIG. 2 is a front view of the radiation and static electricity suppression device disclosed herein.

Referring now to FIG. 2, a radiation and static electricity suppression device 13 is shown. Suppression device 13 includes a mesh screen 14 and a frame 16. Mesh screen 14 is held in frame 16 such that screen 14 may be conformably positioned against the display surface 18 of the cathode ray tube. Such a framed mesh screen for reducing glare is disclosed in U.S. Pat. No. 4,253,737 issued on Mar. 3, 1981 to Eric J. Thomson and Patrick W. Brennan. The mesh screen disclosed in U.S. Pat. No. 4,253,737 is made of a nylon fabric while the mesh screen in this application differs in that at least a certain percentage of the yarns making up the mesh fabric utilized in mesh screen 14 are electrically conductive. The conductive yarns may be nylon coated with a coaxial conductive plastic coating or be made of metal such as steel or bronze. All of the yarns in this device should be coated with a non-reflective coating to reduce glare.

Figure 6:
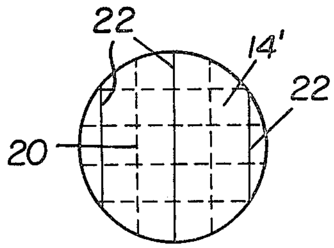
FIGS. 6 and 7 are enlarged views showing alternative arrangements of the mesh screen.
Figure 7:
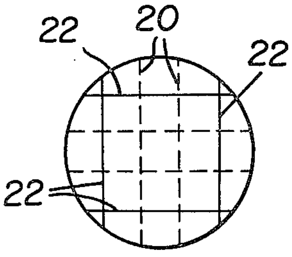

As shown in FIGS. 6 and 7 various embodiments of the mesh fabric 14 are illustrated. It is to be understood that the mesh fabric depicted in FIG. 2 would include material in which warp and weft yarn or fiber is coated with the conductive coating. In FIG. 6 the mesh screen 14" is comprised of non-conducting nylon fibers in the horizontal direction which may be either the warp or the weft as illustrated by the dashed lines. In the vertical direction, every other fiber as illustrated by a solid line 22 is is coated with a conductive plastic coating. In FIG. 7, the coated fibers 22 occur in both the warp and weft noncoated fibers 20 are located between each coated fiber. In particular, for every one coated fiber there are two uncoated fibers. It is important that distribution of the coated fibers be relatively uniform across the surface of the mesh screen and further that they constitute at least one-quarter or more of the warp or the weft in order to provide an adequate screen capable of suppressing electromagnetic radiation and static electricity.

Figure 5:
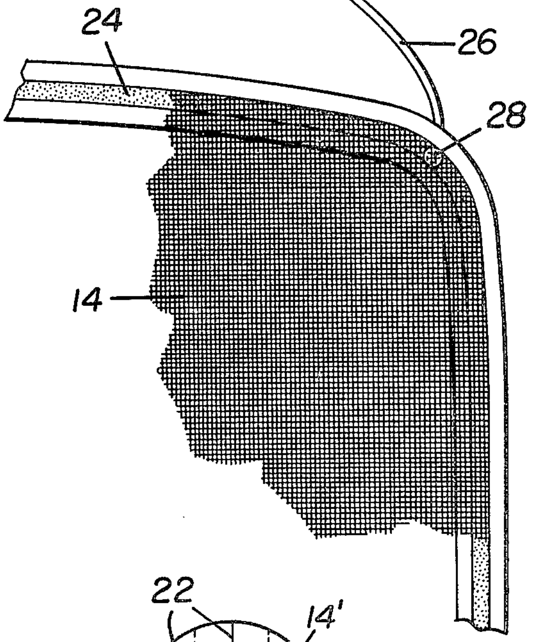
FIG. 5 is a detail of a portion of the mesh screen and frame disclosed herein along with the grounding wire.
Figure 3:
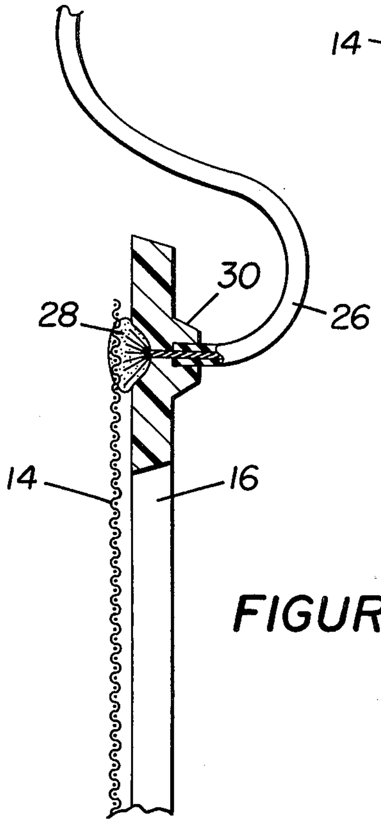
FIG. 3 is a side view of the device shown in FIG. 2.
Figure 4:
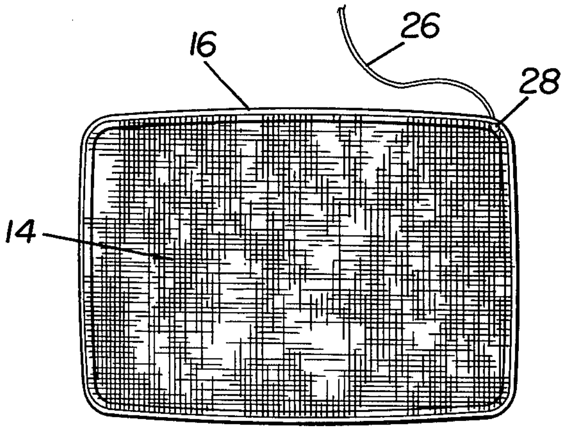
FIG. 4 is a view from the rear of the device as shown in FIG. 2.

Referring now to FIG. 4, the back of frame 16 is illustrated to indicate that the mesh 14 is affixed to the frame by conductive glue having a low impedance, better illustrated in FIG. 5 at 24. The purpose of the conductive glue 24 is to interconnect the ends of the conductive fibers contained in the mesh screen 14. The conductive glue forms an electrical conductive path to a grounding wire 26 which is electrically connected at 28 at the conductive path formed by the glue 24. This is better illustrated in FIG. 3 where the grounding wire 26 is fixed to a plug 30 formed in the screen so that the electrical connection 28 may be made. Frame 16 can be made with an embedded metal strip around the perimeter to which the mesh fabric may be affixed.

Applicability

Referring now to FIG. 1, the mesh screen 14 and frame 16 constitute the radiation and static electricity suppression device 13 as shown in conjunction with cathode ray tube 10 in an expanded relationship. Specifically the suppression device 13 is positioned adjacent to and touching the display surface 18 of the cathode ray tube 10 while concurrently the grounding wire 26 is connected to the appropriate grounding circuitry of the cathode ray tube 10. As indicated in U.S. Pat. No. 4,253,737, the mesh screen 14 should be in contact with the surface 18 of the display screen so that Newton rings and Moire patterns are not formed as a result of the fine mesh screen. Further, the fine mesh screen should be coated with a non-glare surface such as a flat black or gray material. In the case of the nylon mesh, this flat black may be incorporated into the fabric itself.

With the installation of the fine mesh screen 14 on the surface 18 of the cathode ray tube, it has been found that all static electricity is suppressed in front of the cathode ray tube 10 while a substantial portion of the electromagnetic radiation generated within the circuitry of the cathode ray tube and escaping through the faceplate opening of the housing is likewise suppressed. The suppressive capability of individual screens may vary according to the density, weave and material of the screen. However, in utilizing screens having fibers in the range of 0.001 inches 0.00254 centimeters) to 0.003 inches (0.00762 centimeters) and a thread count of 75 to 300 fibers per inch with each fiber coated with a conductive plastic coating and further the fibers having an anti-reflective color such as dark gray or black, excellent results have been observed. Not only is the static electricity supressed, the screen provides a anti-glare feature as described in the earlier patent and further electro-magnetically induced radiation is markedly reduced.

Experimentation has shown that if the mesh fabric 14 includes conductive yarns in both the warp and weft that only a single connection to ground is necessary to eliminate the static field. However, to adequately suppress electromagnetic radiation the frame 16 should be conductive. This may be accomplished by a metal strip formed in frames or by using a conductive glue having a low impedance.

Other aspects, objects and advantages of this invention can be obtained from a study of the drawings, the disclosure and the appended claims.

What is claimed is:

1. A radiation and static electricity suppression device for a cathode ray tube comprising:

a fine mesh fabric in which at least some of either the warp or weft fibers are electrically conductive and further that the electrically conductive fibers are generally evenly distributed across the mesh;

said fine mesh fabric conformable to the viewing surface of the cathode ray tube;

means for electrically connecting said electrical conductive fibers with said cathode ray tube.

2. The radiation and static electricity suppression device of claim 1, wherein the means for electrically connecting the fibers with the cathode ray tube includes a flexible frame conformable to the display surface of the cathode ray tube.

3. The radiation and static suppression device of claim 2 wherein the fine mesh fabric is formed of a synthetic material and further wherein the electrically conductive fibers of the mesh fabric are of a synthetic material having electrically conductive properties.

4. The radiation and static electricity suppression device of claim 1 or claim 3 wherein the fibers are essentially non-reflective.

5. The radiation and static electricity suppression device of claim 3 further including conduit means for connecting the flexible frame with the cathode ray tube.

6. The radiation of static electricity suppression device of claim 1 wherein at least one-third of the individual warp and weft fibers of the fine mesh fabric are electrically conductive.

7. The radiation and static electricity suppression device of claim 6 wherein the means for electrically connecting the electrically conductive fibers with the cathode ray tube includes a flexible frame conformable to the display surface of the cathode ray tube and an electrically conducting glue fixing the fine mesh fabric to the flexible frame.

8. The radiation and static suppression device of claim 3 wherein the synthetic conductive fibers are impregnated with electrically conductive material.

9. The radiation and static suppression device of claim 3 wherein the synthetic fibers are of a synthetic material coated with an electrically conductive material.

* * * * *

REEXAMINATION CERTIFICATE (1235th)

United States Patent [19]

Jandrell

[11] B1 4,468,702

[45] Certificate Issued Apr. 3, 1990

[54] RADIATION AND STATIC ELECTRICITY SUPPRESSION DEVICE

[75] Inventor: Louis H. M. Jandrell, Ashley Gardens, South Africa

[73] Assignee: Daca International, B.V., Sligo, Ireland

Reexamination Request:
No. 90/001,649, Nov. 29, 1988

Reexamination Certificate for:

| | |
|---|---|
| Patent No.: | 4,468,702 |
| Issued: | Aug. 28, 1984 |
| Appl. No.: | 369,127 |
| Filed: | Apr. 16, 1982 |

[51] Int. Cl.[4] ........................ H04N 5/65; H04N 5/64; G02B 27/00

[52] U.S. Cl. .................................... 358/245; 358/252; 358/255; 174/35 TS; 174/35 R; 313/466; 350/276 SL; 350/284; 361/220

[58] Field of Search ............... 313/461, 462, 466, 474; 350/276 R, 276 SL, 284; 174/35 R, 35 MS, 35 TS; 358/245, 246, 247, 250, 251, 252, 253, 254, 255; 361/220

[56] References Cited

U.S. PATENT DOCUMENTS

| | | | |
|---|---|---|---|
| 2,091,152 | 8/1937 | Malpica | 346/110 R |
| 2,182,585 | 12/1939 | Green | 350/318 |
| 2,313,904 | 3/1943 | Brederode | 350/276 R |
| 2,673,342 | 3/1954 | Sims, Jr. et al. | 358/245 |
| 2,942,254 | 6/1960 | Beers | 358/252 |
| 2,943,964 | 7/1960 | Goldenberg | 350/276 R |
| 2,977,412 | 3/1961 | Rhodes et al. | 358/252 |
| 3,084,217 | 4/1963 | Fiore et al. | 358/247 |
| 3,146,305 | 8/1964 | Monaco et al. | 358/247 |
| 3,164,672 | 1/1965 | Spear et al. | 358/247 |
| 3,174,837 | 3/1965 | Mears | 350/276 R |
| 3,194,885 | 7/1965 | Hamilton | 358/252 |
| 3,209,191 | 9/1965 | Hamilton | 358/252 |
| 3,215,054 | 11/1965 | Hamilton | 350/276 R |
| 3,215,776 | 11/1965 | Hamilton | 358/252 |
| 3,215,777 | 11/1965 | Hamilton | 358/252 |
| 3,277,455 | 10/1966 | Viret et al. | 358/252 |
| 3,297,823 | 1/1967 | Neubauer | 358/245 |
| 3,305,623 | 2/1967 | Bakker et al. | 174/35 MS |
| 3,341,391 | 9/1967 | Hamilton et al. | 350/276 R |
| 3,361,548 | 1/1968 | Hamilton et al. | 358/252 |
| 3,362,804 | 1/1968 | Hamilton | 358/252 |
| 3,378,421 | 4/1968 | Hamilton | 156/224 |
| 3,378,636 | 4/1968 | Hamilton | 358/252 |
| 3,378,726 | 4/1968 | Lankow | 361/220 |
| 3,390,447 | 7/1968 | Mears | 350/276 R |
| 3,418,426 | 12/1968 | Schlegel et al. | 358/252 |
| 3,431,348 | 3/1969 | Nellis et al. | 174/35 GC |
| 3,511,560 | 5/1970 | Hamilton | 358/252 |
| 3,582,189 | 6/1971 | Moritz et al. | 358/252 |
| 3,657,474 | 4/1972 | Turnrose | 358/253 |
| 3,706,195 | 12/1972 | Davis et al. | 57/255 |
| 3,909,524 | 9/1975 | Ohkoshi et al. | 358/252 |
| 3,952,152 | 4/1976 | Lill et al. | 358/245 |
| 4,031,553 | 6/1977 | Sumiyoshi et al. | 358/247 |
| 4,232,082 | 11/1980 | Noritake | 428/225 |
| 4,246,613 | 1/1981 | Choder et al. | 358/245 |
| 4,247,737 | 1/1981 | Johnson et al. | 174/35 MS |
| 4,247,871 | 1/1981 | Hirsch et al. | 358/253 |
| 4,253,737 | 3/1981 | Thomsen et al. | 358/252 |
| 4,381,421 | 4/1983 | Coats et al. | 358/245 |
| 4,412,255 | 10/1983 | Kuhlman et al. | 358/252 |

FOREIGN PATENT DOCUMENTS

| | | |
|---|---|---|
| 521316 | 1/1956 | Canada . |
| 0010712 | 9/1982 | European Pat. Off. . |
| 1614020 | 5/1970 | Fed. Rep. of Germany . |
| 2036186 | 1/1972 | Fed. Rep. of Germany . |
| 2329484 | 12/1975 | Fed. Rep. of Germany . |
| 2712321 | 9/1978 | Fed. Rep. of Germany . |
| 801211 | 7/1936 | France . |
| 1055568 | 2/1954 | France . |
| 1383756 | 11/1964 | France . |
| 1588886 | 4/1970 | France . |
| 36-25434 | 9/1961 | Japan . |
| 46-13960 | 4/1971 | Japan . |
| 47-14078 | 1/1972 | Japan . |
| 53-131729 | 11/1978 | Japan . |
| 58-32884 | 7/1983 | Japan . |
| 415437 | 9/1980 | Sweden . |
| 539428 | 9/1941 | United Kingdom . |
| 675925 | 7/1952 | United Kingdom . |
| 810814 | 3/1959 | United Kingdom . |
| 1354409 | 5/1974 | United Kingdom . |

OTHER PUBLICATIONS

G. L. Beers, Journal of the SMPTE, Jun. 1957, vol. 66, pp. 347–354.

Hewlett Packard, 1977 Electronic Instruments and Systems Catalog, Oscilloscope Viewing Accessories, Light Filter 10102A.

OCLI Data Sheet, "Tempest Shielded Windows for Visual Display Terminals", date unknown.

Tecknit Data Sheet EMC–700, "Electrically Conductive Transparent Coated EMI Shielded Optical Display Windows", date unknown.

Tecknit Data Sheet 710, "EMC–Glas Windows—Fine Mesh Laminated Optical Display Windows", date unknown.

Kirk–Othmer, *Encyclopedia of Chemical Technology*, 3rd Ed., vol. 10, pp. 148–149 (John Wiley & Sons, N.Y.).

Kirk–Othmer, *Encyclopedia of Chemical Technology*, 3rd Ed., vol. 12, pp. 883–885 (John Wiley & Sons, N.Y.).

*Primary Examiner*—James J. Groody
*Attorney, Agent, or Firm*—Townsend and Townsend

[57] ABSTRACT

A radiation and static electricity suppression device is disclosed that is formed of a mesh fabric having at least some of the yarns capable of conducting electricity. The mesh is affixed to a frame that serves to conform the mesh to the surface of a cathode ray tube. A grounding connection is included to ground the mesh to the chassis of the cathode ray tube. The mesh when grounded supresses the static field and significantly reduces electro-magnetic radiation emanating from the CRT circuitry and passing through the opening in the CRT housing.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 7, and 8 are determined to be patentable as amended.

Claims 2, 3, 4, 5, 6, and 9, dependent on an amended claim, are determined to be patentable.

1. A radiation and static electricity suppression device for a cathode ray tube comprising:
   a fine mesh fabric in which at least some of either the warp or weft fibers are electrically conductive and further that the electrically conductive fibers are generally evenly distributed across the mesh;
   said fine mesh fabric [conformable to] *being positionable in conforming contact with* the viewing surface of the cathode ray tube; *and*
   means for electrically connecting said electrical conductive fibers with said cathode ray tube.

7. [The] *A* radiation and static electricity suppression device [of claim 6] *for a cathode ray tube comprising:*
   *a fine mesh fabric in which at least some of either the warp or weft fibers are electrically conductive and further that the electrically conductive fibers are generally evenly distributed across the mesh;*
   *said fine mesh fabric conformable to the viewing surface of the cathode ray tube; and*
   *means for electrically connecting said electrical conductive fibers with said cathode ray tube;*
   *wherein at least one-third of the individual warp and weft fibers of the fine mesh fabric are electrically conductive; and*
   wherein the means for electrically connecting the electrically conductive fibers with the cathode ray tube includes a flexible frame conformable to the display surface of the cathode ray tube and an electrically conducting glue fixing the fine mesh fabric to the flexible frame.

8. [The] *A* radiation and static *electricity* suppression device [of claim 3] *for a cathode ray tube comprising:*
   *a fine mesh fabric in which at least some of either the warp or weft fibers are electrically conductive and further that the electrically conductive fibers are generally evenly distributed across the mesh;*
   *said fine mesh fabric conformable to the viewing surface of the cathode ray tube; and*
   *means for electrically connecting said electrical conductive fibers with said cathode ray tube;*
   *wherein the means for electrically connecting the fibers with the cathode ray tube includes a flexible frame conformable to the display surface of the cathode ray tube;*
   *wherein the fine mesh fabric is formed of a synthetic material and further wherein the electrically conductive fibers of the mesh fabric are of a synthetic material having electrically conductive properties; and*
   wherein the synthetic conductive fibers are impregnated with electrically conductive material.

* * * * *